US006935939B1

(12) United States Patent
Buser et al.

(10) Patent No.: US 6,935,939 B1
(45) Date of Patent: Aug. 30, 2005

(54) DUST-CAPTURING DEVICE FOR A SAW

(76) Inventors: John P. Buser, 837 Cornish Dr., San Diego, CA (US) 92107; Terry R. Alley, 7602 SW. 60th St., Augusta, KS (US) 67010

( * ) Notice: Subject to any disclaimer, the term of this patent is extended or adjusted under 35 U.S.C. 154(b) by 25 days.

(21) Appl. No.: 10/672,757

(22) Filed: Sep. 26, 2003

Related U.S. Application Data

(63) Continuation-in-part of application No. 10/147,128, filed on May 15, 2002, now Pat. No. 6,748,660.

(51) Int. Cl.[7] .............................................. B24B 55/04
(52) U.S. Cl. .......................... 451/451; 451/456; 30/12
(58) Field of Search .......................... 125/13.01, 13.03; 451/359, 451, 453, 454, 455, 456; 30/166.3, 30/389, 390, 391; 83/168

(56) References Cited

U.S. PATENT DOCUMENTS 4,253,362 A * 3/1981 Olson .......................... 83/100
5,125,190 A 6/1992 Buser et al. .................. 51/273
5,566,457 A * 10/1996 Batschari et al. ............. 30/390
5,588,213 A * 12/1996 Swanberg .................... 30/124
5,774,992 A * 7/1998 Lindenmuth ................. 30/124
5,931,072 A * 8/1999 Shibata .......................... 83/98
6,108,912 A * 8/2000 Radigan ...................... 30/124
6,167,626 B1 * 1/2001 Doumani et al. ............. 30/124
6,318,352 B1 * 11/2001 Gnazzo et al. ................ 125/12
6,557,261 B1 * 5/2003 Buser et al. .................. 30/124
6,796,208 B1 * 9/2004 Jorgensen .................... 83/100

* cited by examiner

*Primary Examiner*—M. Rachuba
(74) *Attorney, Agent, or Firm*—Frank G. Morkunas

(57) ABSTRACT

For a power saw, a dust-capturing device having a hollow capture member with openings on each end wherein one end captures dust and the other end discharges the dust into an attached external vacuum device; a support member securable to, and translatable on, the capture member; and a mounting member pivotably attached to the support member at one end and adapted to adjustably secure the capture member to the power saw at the other end.

10 Claims, 2 Drawing Sheets

DUST-CAPTURING DEVICE FOR A SAW

CROSS REFERENCES TO RELATED APPLICATIONS

This is a continuation-in-part to application Ser. No. 10/147,128 filed on May 15, 2002 now U.S. Pat. No. 6,748,660.

STATEMENT REGARDING FEDERALLY-SPONSORED RESEARCH OR DEVELOPMENT

Not applicable.

BACKGROUND OF THE INVENTION

This present invention relates to an improvement in a device for capturing and displacing debris generated when using a power tool, and more particularly to a power circular saw of any size.

Power tools are the mainstay of most construction, maintenance, and repair projects; whether done commercially or by a handyman (as used herein, the term 'handyman' or 'handymen' is meant to encompass both genders and does not relate only to the male). When using a power saw, in particular, a portable power circular saw with exposed rotating blade, as the blade cuts the material upon which it is operating, the cut portions of the material are displaced therefrom in tiny particles which, for administrative clarity for this application will be referred to as dust.

The rotation of the saw blade can be extremely fast and may rotate away from or toward the user. Saws with a blade rotating 'away' from the user are those which have the exposed portion of the blade moving forward of or away from the user and thereby displace dust at the front of the saw, whereas saws with a blade rotation toward the user have the exposed portion of the blade moving back toward the user and displace dust downward or at the rear of the saw. Regardless, such saw blades can be extremely hard and sharp, the dust created by cutting materials with this saw can be dense, can create an unsafe environment, and, because of the blade's rotation, is displaced forward and upward toward the user and, thereby, can create an unhealthy environment for the worker using the saw.

The dust, if left uncaptured or undercaptured, can permeate and contaminate the workplace. The workplace may be a food processing facility, may be a health care facility, may have dust-sensitive equipment (such as a computer or delicate scientific or medical instruments), may be a home. Various governmental regulatory agencies mandate some forms of dust control under many, if not all, commercial situations.

The worker using the circular saw also is at risk, not only from using a potentially dangerous tool but also from inhaling the dust; particularly since the dust is being displaced directly up toward the user's face. On-lookers, passers-by, employees of the facility at which work is being performed also will inhale the dust generated by the saw. Attempts to curtail the amount of dust cast into the work space include use of a water spray in conjunction with the cutting [generally used when cutting into concrete for example]. Using a water spray, however, presents another potential hazard in conjunction with electrical power tools—that of electric shock hazards.

Another attempt to curtail the amount of dust projected into the work space is the use of a bag attached, at a strategic location, to the power tool into which the dust, by rotational action, reciprocating action, or centrifugal action, is forced into the bag and collected thereat. Though useful to capture some dust, in reality, most dust generated by circular saws is not captured and is emitted into the work place nonetheless to contaminate the work place and breathable air. This has not proven to be as effective as is necessary and desirable; particularly with saws which displace dust at the front of the saw. Moreover, dust collection bags are better suited for stationary saws, not portable saws.

Stationary saws generally are larger than portable saws, heavier than portable saws, and because of these factors, a dust collection bag can be fitted onto the stationary saw and it can be expected to remain where fitted. Portable saws are not well suited for such bags. Portable saws are routinely moved about from job site to job site, and from work area to work area within a job site. By their very nature, they are moved constantly when being operated. It is the saw which is moved, not the material being cut, when a portable circular saw is being used. Such repeated movements would jostle the dust collector bag, loosen it, and ultimately displace it from the saw. As a result, portable circular saws are not well suited for such dust collectors.

Dust collection systems of which the inventors are aware are lacking in use of a dedicated vacuum for dust capture. Generally such systems operate off the vacuum generated by the cooling fan of the motor. This is of limited utility and only generates a slight discernable vacuum to aid in capturing or directing dust into a collection bag or other collection mechanism. Such systems also rely on the centrifugal forces generated, and imparted to the dust, by the rotation of the cutting blade. This, standing alone or in combination with the vacuum generated by the cooling fan is of limited utility in capturing dust.

Use of a dedicated vacuum as envisioned by the device of the co-pending application [application Ser. No. 10/147,128 filed on May 15, 2002], or in conjunction with one or more side shields as set forth in my prior patent [U.S. Pat. No. 6,557,261], has solved many of the problems noted above. The present invention is a remarkable and novel improvement over the prior art and over the above-referenced co-pending application.

Another method of curtailing dust contamination is use of a respirator or face mask to filter out dust before it can be inhaled. This method, however, is suited only for the worker or workers involved in the project and not for the passers-by, on-lookers, and employees of the facility. Use of a respirator, however, increases costs associated with a project, is cumbersome, and adversely affects the mobility of the worker. As for a face mask, a good portion of the dust by-passes the face mask and is nonetheless inhaled by the worker. There is no device available which is simple to use, which is easy to manufacture, and which captures virtually all the dust emitted by a circular power saw; particularly power cut-off saws with saw blade diameters of up to 20 inches or more and which blade rotates 'forward' emitting dust at the lead edge of the cut and up and at the user's face. The present invention embodies the features discussed above and creates a more clear vision for the user as to the desired path of cut; all which are missing from the prior art, including co-pending application Ser. No. 10/147,128.

The present invention can be made of virtually any materials including, but not limited to, metals, plastics, and composites. It can be adapted to fit on virtually any type and size of circular power saw using only the existing components of the power saw without modification to install. When installed, the present invention will not interfere with the operation of the saw; but, in fact, will enhance the life of the saw and the blade by preventing dust from entering and contaminating the saw motor and by removing excess dust from the blade immediately after a cut is being made. It is crafted to initiate the capturing of dust at the initial point of dust creation; i.e., at the front of the saw at a point where the blade engages the material it is to cut—at that point, capture and extraction occur. The device should be used with an external vacuum system resulting in the ultimate capture and extraction of dust.

Accordingly, several objects/advantages of my invention are:

a. to capture virtually all dust emitted by a circular saw in operation;
b. to prevent dust from entering and contaminating the gears and motor thereby enhancing the useful life of a circular saw and the saw blade;
c. create a safer and healthier work environment for a user of a circular saw and for all others in or near the vicinity where such use is ongoing;
d. provide a dust-capture device capable of being mounted on circular saws of virtually all shapes, sizes, and models without effecting the efficiency and effectiveness of the saw upon which the device is attached;
e. capture dust at the point of cut and maintain a clear vision for the user for the path of cut;
f. provide an easy-to-install, easy-to-use, and economical dust capture device for circular power saws;
g. be attachable to a circular power saw without modifications to said circular power saw and, consequently, not adversely affecting the saw manufacturer's built-in safety features; and
h. function as a dust collector regardless of the depth of cut being made by the user.

The foregoing has outlined some of the more pertinent objects of the present invention. These objects should be construed to be merely illustrative of some of the more prominent features and applications of the intended invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF SUMMARY OF THE INVENTION

The above-noted problems, among others, are overcome by the present invention. Briefly stated, the present invention contemplates a dust-capturing device for a portable power circular saw, the dust-capturing device having a hollow capture member with openings on each end wherein one end captures dust and the other end discharges the dust into an attached external vacuum device; a support member securable to, and translatable on, the capture member; and a mounting member pivotably attached to the support member at one end and adapted to adjustably secure the capture member to the power saw at the other end.

The foregoing has outlined the more pertinent and important features of the present invention in order that the detailed description of the invention that follows may be better understood so the present contributions to the art may be more fully appreciated. Additional features of the present invention will be described hereinafter which form the subject of the claims. It should be appreciated by those skilled in the art that the conception and the disclosed specific embodiment may be readily utilized as a basis for modifying or designing other structures and methods for carrying out the same purposes of the present invention. It also should be realized by those skilled in the art that such equivalent constructions and methods do not depart from the spirit and scope of the inventions as set forth in the appended claims.

BRIEF DESCRIPTION OF THE DRAWINGS

For a fuller understanding of the nature and objects of the invention, reference should be had to the following detailed description taken in conjunction with the accompanying drawings in which.

DETAILED DESCRIPTION OF THE INVENTION

Figure 1:
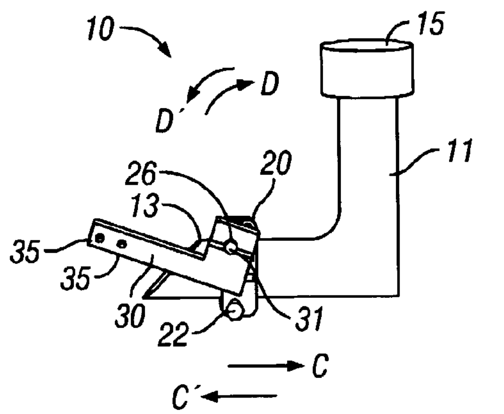
FIG. 1 is a side elevation view of the preferred embodiment of the present invention.

Referring now to the drawings in detail and in particular to FIG. 1, reference character 10 illustrates the dust-capturing device in assembled form. A hollow capture member 11 has a first end 13 with an opening thereat and a second end 15 also with an opening thereat to permit flow-through of debris or dust entering the hollow capture member 11. The second end 15 is adapted to receive an external hose 75 [shown in FIGS. 4 and 5] which is attached to an external vacuum device [not shown].

A support member 20 is attached to the hollow collection member 11, registers thereon, and may be slid back and forth on the hollow capture member 11 as reflected by directional arrows C, C'. A mounting member 30 is attached at one end to the member 30 to pivot or rotate at the point of attachment as reflected by directional arrows D, D'.

Figure 2:
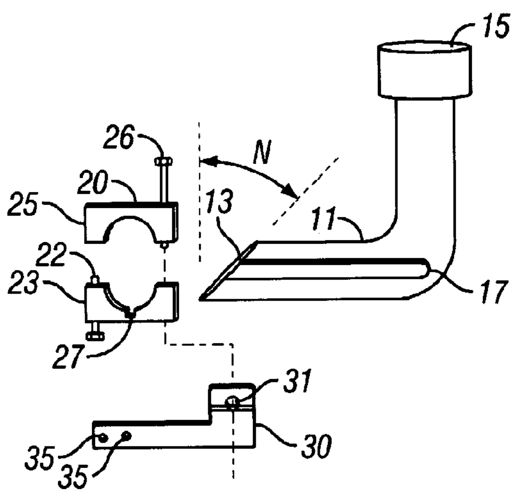
FIG. 2 is a detailed exploded view of the present invention.

FIG. 2 illustrates the registration facet of the present invention. As shown here, a step or projection 17 on the hollow capture member 11 forms one aspect of the registration facet and a cooperating groove 27 on the inside surface of one section [reference character 23 in this example] of the support member 20 forms the other aspect of the registration facet. In this regard, the support member 20 may be comprised of a first section 23 and a second section 25 which may be formed of two removable sections or of an expandable single piece. A two-section structure is shown in the figures.

Suitable fasteners 22, 26 secure the support member 20 onto the hollow capture member 11. Loosening either or both such fasteners 22, 26 loosens the fit of the support member 20 on the hollow capture member 11 thereby facilitating the translation of the support member 20 back and forth, as necessary, on the hollow capture member 11.

As a preferred embodiment, fastener 22 fits through an opening of the first section 23 and secures onto a corresponding threaded opening on the second section 25. Fastener 26 fits through an opening in the second section 25 and through a corresponding opening in the first section 23 and completely therethrough exposing a threaded end to fastener 26 [see FIG. 3A].

The support member 20 is fitted onto the hollow capture member 11 with the respective registration facets in a cooperating relationship; i.e., the step 17 on the hollow capture member 11 aligned with the groove 27 on the first section 23 of the support member 20. The illustration as such is merely for reference purposes and not meant to be a means of limitation in that the groove aspect may be on the hollow capture member 11 or on the support member 20 [either first section 23 or second section 25] and the respective corresponding projection may be on the support member 20 [either first section 23 or second section 25] or on the hollow collection member 11.

The shape of the projection-groove registration facet may be of any suitable geometric shape, including, but not limited to, squared, rectangular, or polygonal as illustrated by reference characters 17, 27 in FIG. 3A; or curved or spherical as illustrated by reference characters 17', 27' in FIG. 3B; or triangular as illustrated by reference characters 17", 27" in FIG. 3C; and, as to the hollow collection member 11, may be on any side or location; i.e., on top, on the bottom, on the right side, or on the left side, or at any position in between. Additionally, the hollow collection member 11 also may be of any shape; circular, spherical, triangular, polygonal.

Figure 3A:
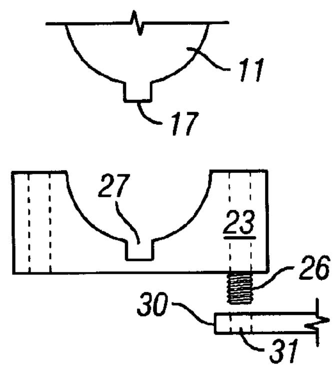
FIGS. 3A–3C are detailed partial views of several embodiments of the registration member of the present invention.
Figure 3B:
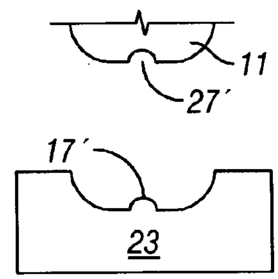
Figure 3C:
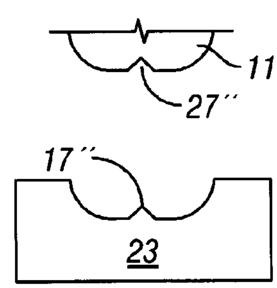
Figure 4:
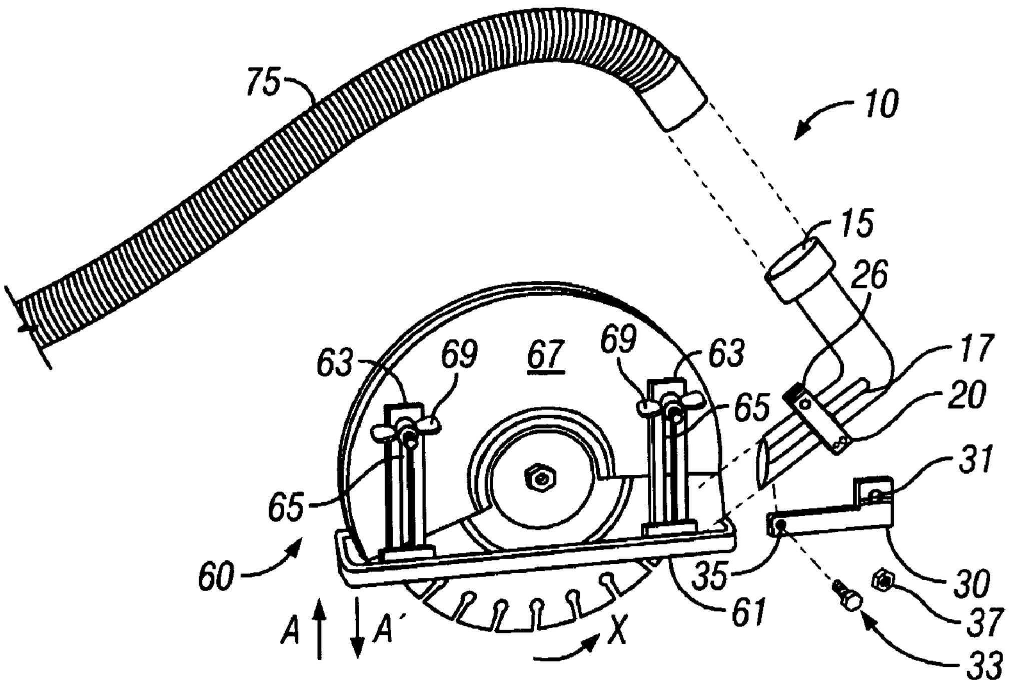
FIG. 4 is detailed side elevation view of the present invention, in a partially exploded view, as it would be fitted onto a circular power saw.
Figure 5:
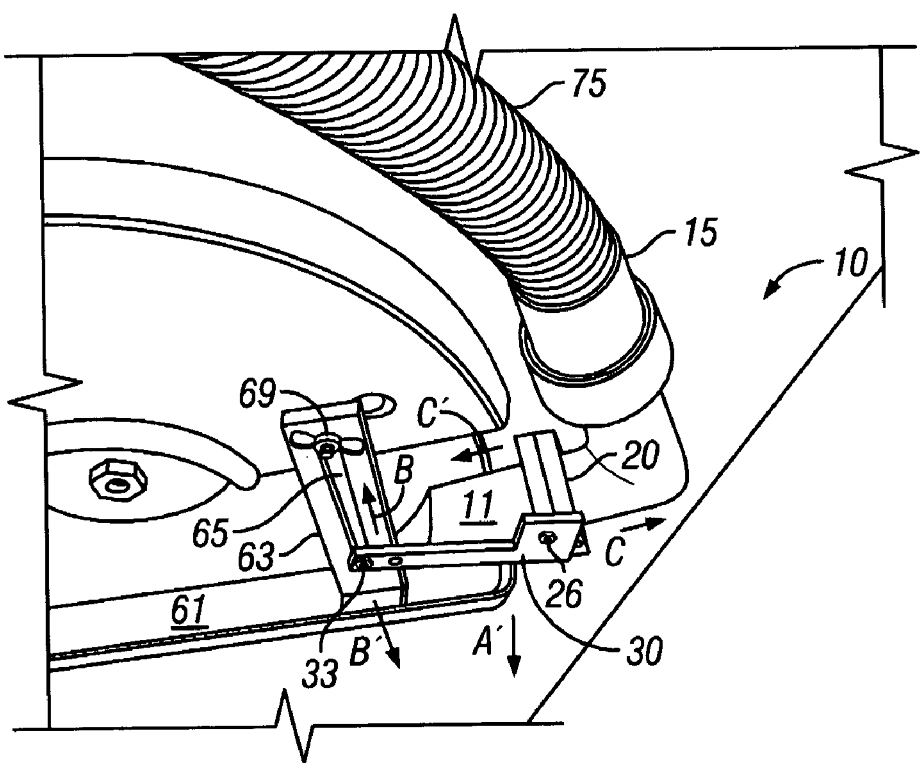
FIG. 5 is a detailed view of the present invention attached to a circular power saw.

The mounting member 30 is pivotally attached to the support member 20 at the threaded pivot aperture 31 of the mounting member 30 at one end by means of the correspondingly threaded end of fastener 26 [see FIG. 3A for the detail]. One or more mounting aperture 35, at the other end of the mounting member 30, is adapted to mount the dust-capturing device 10 to an external power saw 60. FIGS. 4 and 5 illustrate the dust-capturing device 10 mountable and mounted to a power saw 60.

In FIG. 4, the mounting member 30 is shown to be broken away from the support member 20. This is merely illustrated as such for administrative convenience and ease of understanding. In operation, the mounting member 30 would be pivotably attached to the support member 20 through threaded aperture 31 and the threaded end of fastener 26; and the mounting member 30 would be pivotably and slidably attached to the saw 60 by a suitable fastener combination 33, 37 by means of mounting aperture 35. In this regard, a threaded fastener 33, by means of illustration only not by means of limitation, such as a bolt or screw with a cooperating nut 37 could be used as illustrated in FIG. 4. Here the bolt or screw 33 inserts through mounting aperture 35 and then through the channel 65 on the adjusting arm 63 of the base 61 and is secured thereat by threading the nut 37 onto the exposed threading of the bolt or screw 33 and tightening.

This type of cut-off saw 60 may have blades ranging from between about 10-inches to about 20-inches or more and an adjustable plate 61. The blade of this type of saw generally rotates forward in the direction noted by directional Arrow X and, thereby, discharges dust from the cut in front of the user and up toward the user's face.

The desired depth of cut and angle of saw 60 is made by loosening wing nuts 69 attached to corresponding threaded studs on the saw shield 67. The plate 61 is attached to the guides 63 and is movable up and down in the direction or Arrows A, A' by loosening either or both of the wing nuts 69, moving the plate 61, front or back or both, up or down as needed or necessary for the cut, and, once the desired cut-position is attained, tightening the respective wing nut or wing nuts 69 thereat.

Since the dust-capturing device 10 is attached to the saw 60, it must be capable of accommodating and adjusting to the movement of the saw base 61. In this regard, as the saw plate 61 is so moved, the mounting member 30 pivots in the directions reflected by Arrows D, D' and the other end of the mounting member 30, where mounted to the channel 65 on the guide 63 may pivot accordingly and may translate within the channel 65 as illustrated by directional Arrows B, B'. Once the desired depth of cut and saw angle is fixed, the dust-capturing device 10 may be fully registered and adjusted for the best possible dust-capture operation by sliding the end of the mounting member 30, which is attached to the channel 65, either up and down within the channel 65, and by sliding the supporting member 20 back and forth on the hollow capture member 11, either or both actions, until the optimal dust-capturing position is attained at which point the respective fasteners 33, 37 and 20 and/or 26 are securely tightened in place.

The first end 13 and the second end 15 of the hollow capture member 11 also may be disposed at any angle and have a squared edge at the juncture of the first end 13 and the second end 15, may be curved [as illustrated in FIG. 2] or may form a straight line. Additionally, the opening at the first end 13 may bear any angle as represented by reference character N. Such angle may range from 0° to approximately 85°, though angles of between about 30° to about 60° seem to have a better capturing effect in view of the depth-of-cut variations suited and necessary for any particular job site.

The present disclosure includes that contained in the present claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention. Accordingly, the scope of the invention should be determined not by the embodiment[s] illustrated, but by the appended claims and their legal equivalents.

The invention claimed is:

1. A dust-capturing device for a power saw having a foot plate, a blade guard and a guide on the blade guard with a channel disposed on the guide, said dust-capturing device comprising:

(a) a hollow capture member having a first end with an opening thereat and a second end with an opening thereat;

(b) a support member securable to said capture member;

(c) a mounting member attached to said support member and adapted to secure said capture member within the channel of the power; and (d) an adjustment means for adjusting said device to accommodate varying depths of cut made by a user wherein said adjustment means comprises a pivot connection between said mounting member and the channel on the guide.

2. The device as defined in claim 1 further comprising a registration means for registering said support member to said first end of said capture member.

3. The device as defined in claim 2, wherein said registration means comprises a projection and cooperating groove on said support member and said first end of said capture member.

4. The device as defined in claim 3 wherein said projection and cooperating groove bear any geometric shape selected from the group consisting of squared, rectilinear, triangular, and rounded.

5. The device as defined in claim 3 wherein said projection is a longitudinal projection of said first end of said capture member and said cooperating groove is disposed on an inner surface of said support member.

6. The device as defined in claim 3 wherein said projection is disposed on an inner surface of said support member and said cooperating groove is a longitudinal groove on said first end of said capture member.

7. The device as defined in claim 1 wherein said adjustment means further comprises a pivot connection between said support member and said mounting member.

8. The device as defined in claim 1 wherein said adjustment means further comprises a translating connection at said pivot connection between said mounting member and the channel on the guide.

9. The device as defined in claim 1 wherein the opening at said first end is disposed at an angle between 0° and approximately 80°.

10. The device as defined in claim 1 wherein the opening at said first end is disposed at an angle between approximately 30° and approximately 60°.

* * * * *